United States Patent
Ingraham

(10) Patent No.: US 6,893,672 B2
(45) Date of Patent: May 17, 2005

(54) PEELABLE FILM AND PACKAGING MADE THEREFROM

(75) Inventor: Brian Ingraham, Greenville, WI (US)

(73) Assignee: Pechiney Emballage Flexible Europe (FR)

(*) Notice: Subject to any disclaimer, the term of this patent is extended or adjusted under 35 U.S.C. 154(b) by 0 days.

(21) Appl. No.: 10/010,138

(22) Filed: Dec. 6, 2001

(65) Prior Publication Data

US 2003/0064181 A1 Apr. 3, 2003

Related U.S. Application Data

(60) Provisional application No. 60/318,211, filed on Sep. 7, 2001.

(51) Int. Cl.[7] ............................................. B65D 81/34
(52) U.S. Cl. .................... 426/107; 426/113; 426/124; 426/126; 426/134; 428/35.7; 428/475.8; 428/476.1
(58) Field of Search ................................. 426/107, 113, 426/124, 126, 127, 393; 428/35.7, 475.8, 476.1, 349, 475.5

(56) References Cited

U.S. PATENT DOCUMENTS

| | | | |
|---|---|---|---|
| 3,090,998 A | 5/1963 | Heisterkamp et al. ......... 18/57 |
| 3,337,663 A | 8/1967 | Taga .......................... 264/89 |
| 3,456,044 A | 7/1969 | Pahlke ........................ 264/567 |
| 3,912,843 A | 10/1975 | Brazier ....................... 428/474 |
| 4,095,012 A | 6/1978 | Schirmer ..................... 428/474 |
| 4,233,367 A | 11/1980 | Ticknor et al. ............ 428/476.3 |
| 4,254,169 A | 3/1981 | Schroeder .................... 428/35 |
| 4,284,674 A | 8/1981 | Sheptak ....................... 428/69 |
| 4,322,480 A | 3/1982 | Tuller et al. .............. 428/476.1 |
| 4,346,834 A | 8/1982 | Mazumdar .................... 525/240 |
| 4,355,721 A | 10/1982 | Knott, II et al. ......... 206/524.2 |
| 4,405,667 A | 9/1983 | Christensen et al. .......... 428/35 |
| 4,407,873 A | 10/1983 | Christensen et al. .......... 428/35 |
| 4,461,808 A | 7/1984 | Mollison ................. 428/475.8 |
| 4,501,798 A | 2/1985 | Koschak et al. ............ 428/349 |
| 4,615,922 A | 10/1986 | Newsome et al. ............. 428/35 |
| 4,640,852 A | 2/1987 | Ossian ........................ 428/35 |
| 4,647,483 A | 3/1987 | Tse et al. ..................... 428/35 |
| 4,683,094 A | 7/1987 | Sharps, Jr. ................... 264/38 |

(Continued)

FOREIGN PATENT DOCUMENTS

| | | |
|---|---|---|
| EP | 0 686 497 A2 | 12/1995 |
| EP | 0 753 403 A2 | 1/1997 |

OTHER PUBLICATIONS

BASF, "Ultramid B KR4418", printed from http://www.basf.com/static/OpenMarket/Xcelerate/Preview_cid–1051016436405_pubid–1044368075691_c–pparticle.html, Dec. 2003.

(Continued)

Primary Examiner—Sandra M. Nolan
(74) Attorney, Agent, or Firm—McDermott Will & Emery LLP

(57) ABSTRACT

The present invention relates to a multilayer polymeric film structure and a food package made therefrom. Specifically, the present invention relates to a seven-layer non-EVOH structure having six layers of alternating nylon and adhesive, and a seventh layer of a heat sealable polymer. Either the sixth layer comprising the adhesive or the seventh layer comprising the heat sealable polymer may further comprise a polymer, preferably polybutylene, polypropylene and/or high density polyethylene, that may allow the film structure to be easily peelable when heat sealed. Moreover, the present invention relates to food packages made by the film structures having a easy-open peelable seal component contained therein.

2 Claims, 4 Drawing Sheets

U.S. PATENT DOCUMENTS

| | | | |
|---|---|---|---|
| 4,683,170 A | 7/1987 | Tse et al. | 428/349 |
| 4,695,491 A | 9/1987 | Kondo et al. | 428/35 |
| 4,729,926 A | 3/1988 | Knoteles et al. | 428/474.7 |
| 4,731,214 A | 3/1988 | Kondo et al. | 264/514 |
| 4,734,327 A | 3/1988 | Vicik | 428/332 |
| 4,735,855 A | 4/1988 | Wofford et al. | 428/349 |
| H469 H | 5/1988 | Deak | 428/35 |
| 4,746,562 A | 5/1988 | Fant | 428/213 |
| 4,755,419 A | 7/1988 | Shah | 428/220 |
| 4,764,404 A | 8/1988 | Genske et al. | 428/35 |
| 4,788,105 A | 11/1988 | Mueller et al. | 428/412 |
| 4,816,304 A | 3/1989 | Nohara et al. | 428/36.7 |
| 4,818,592 A | 4/1989 | Ossian | 428/216 |
| 4,855,178 A | 8/1989 | Langley | 428/287 |
| 4,877,684 A | 10/1989 | Shepard et al. | 428/475.8 |
| 4,882,229 A * | 11/1989 | Hwo | 428/461 |
| 4,883,696 A | 11/1989 | Iwanami et al. | 428/35.4 |
| 4,909,726 A | 3/1990 | Bekele | 428/34.3 |
| 4,911,963 A | 3/1990 | Lustig et al. | 428/36.91 |
| 4,937,112 A | 6/1990 | Schirmer | 428/34.3 |
| 4,966,795 A | 10/1990 | Genske et al. | 428/34.3 |
| 4,977,022 A | 12/1990 | Mueller | 428/349 |
| 4,983,431 A | 1/1991 | Gibbons et al. | 428/34.2 |
| 4,990,382 A | 2/1991 | Weissenstein et al. | 428/35.7 |
| 4,997,710 A | 3/1991 | Pockat et al. | 428/349 |
| 4,999,229 A | 3/1991 | Moritani et al. | 428/36.6 |
| 5,053,259 A | 10/1991 | Vicik | 428/36.91 |
| 5,068,077 A | 11/1991 | Negi et al. | 264/512 |
| 5,079,051 A | 1/1992 | Garland et al. | 428/34.9 |
| 5,084,352 A | 1/1992 | Percec et al. | 428/412 |
| 5,096,974 A | 3/1992 | MacLeay et al. | 525/327.6 |
| 5,109,049 A | 4/1992 | Shepard et al. | 524/425 |
| 5,122,329 A | 6/1992 | Mort et al. | 264/569 |
| 5,169,697 A | 12/1992 | Langley et al. | 428/57 |
| 5,194,306 A | 3/1993 | Blatz | 428/354 |
| 5,213,900 A | 5/1993 | Friedrich | 428/474.4 |
| 5,310,584 A | 5/1994 | Jacoby et al. | 426/127 |
| 5,348,794 A | 9/1994 | Takahashi et al. | 428/213 |
| 5,382,470 A | 1/1995 | Vicik | 428/334 |
| 5,397,640 A | 3/1995 | Georgelos et al. | 428/349 |
| 5,441,781 A | 8/1995 | Uchida et al. | 428/35.7 |
| 5,491,009 A | 2/1996 | Bekele | 428/35.7 |
| 5,534,277 A | 7/1996 | Ramesh et al. | 426/129 |
| 5,549,943 A | 8/1996 | Vicik | 428/34.8 |
| 5,562,996 A | 10/1996 | Kuriu et al. | 428/474.4 |
| 5,837,358 A | 11/1998 | Bauer et al. | 428/213 |
| 6,068,933 A | 5/2000 | Shepard et al. | 428/474.4 |
| 6,562,476 B2 | 5/2003 | Shepard et al. | 428/475.8 |

OTHER PUBLICATIONS

Equistar, "Plexar PX 108", printed from equistarchem.com on Jan. 9, 2004.

Database WPI, Section CH, Week 199031, Derwent Publications, Ltd., London, GB; AN 1990–231464 XP002232261 & AU 39330 89 A (Grace & Co. W R), Mar. 29, 1990.

Database WPI, Section Ch, Week 199927, Derwent Publications, Ltd., London, GB; AN 1999–322263 XP002232262 & JP 11 115128 A (Mitsubishi Plastics Ind Ltd), Apr. 27, 1999.

* cited by examiner

US 6,893,672 B2

PEELABLE FILM AND PACKAGING MADE THEREFROM

This application claims the benefit of provisional application Ser. No. 60/318,211, filed 07 Sep. 2001, now abandoned.

FIELD OF THE INVENTION

The present invention relates to a thermoplastic polymeric film that may be used for the packaging of products, especially food products such as frozen pizza, frozen vegetables, and other frozen foods. More specifically, the present invention is in the field of polymeric thermoplastic films that form packages that heat-seal together, but are peelable. Further, the present invention relates to a thermoplastic polymeric film that is an improvement over the thermoplastic polymeric film described and claimed in U.S. Pat. No. 6,068,933 to Shepard et al.

BACKGROUND OF THE INVENTION

Polymeric films are widely used in the packaging field for the packaging of products, especially food products. Films used for the packaging of food generally contain multiple layers, in which each layer adds certain desired physical or chemical properties to the completed film. For example, an "abuse" layer may serve to protect the packaged product from physical abuse or stresses caused by the normal handling of the product during packaging, shipping, or during commercialization. In addition, a heat sealant layer may be utilized to bond films together to form packages for products, such as food products. Further, the combination of layers may allow for a film that has favorable physical properties, such as, for example, strength, stiffness, and abrasion resistance. However, the film layers must be compatible and the film structure created thereby must be stable.

One such layer that may be utilized as an abuse layer and to increase the toughness of films made therefrom is a layer comprising a polyamide. A polyamide is a high molecular weight polymer having amide linkages along the molecular chain structure. Nylon polyamides, which are synthetic polyamides, have favorable physical properties of high strength, stiffness and abrasion resistance.

It is, of course, generally known to provide multilayer polymeric films that may have high strength, stiffness and/or abrasion resistance. Many such films may have a barrier layer of EVOH copolymer sandwiched by layers comprising a nylon polyamide. The following patents are of interest in illustrating prior art polymeric films, albeit having a core layer of EVOH between two layers of nylon.

Commonly owned U.S. Pat. No. 4,284,674, to Sheptak, teaches a polymeric thermal insulation product with an EVOH core layer adhered on each side to a nylon layer. The nylon layer is adhered to another layer of a polyolefin, such as an oriented polypropylene.

Commonly owned U.S. Pat. No. 4,355,721, to Knott, teaches at column 5, lines 44 to 52, a multilayer polymeric film for food packaging having a core barrier layer of EVOH sandwiched between two nylon layers. An adhesive layer and HDPE sealant layer are disposed on one side of one of the nylon layers.

Commonly owned U.S. Pat. No. 4,640,852, to Ossian, discloses a multilayer polymeric film with a core layer of EVOH sandwiched between two nylon layers. The film may have additional fourth and fifth layers of an adhesive and a heat sealable polymer disposed on one side of the nylon layers, and sixth and seventh layers of an adhesive and a LLDPE or propylene-ethylene copolymer disposed on the other nylon layer.

U.S. Pat. No. 4,695,491, to Kondo, teaches a heat shrinkable composite packaging film. The film has a core layer of EVOH that is surrounded on one side by a first layer of a polymer having a low permeability to hot water, and on the opposing side an outermost layer of antiblocking polymer. The outermost layer may be a nylon.

U.S. Pat. No. 4,729,926, to Koteles, discloses at column 4 a polymeric film having the following structure:
tie/nylon/EVOH/nylon/tie/LDPE/primer/outer layer
The outer layer may be any of various polymeric materials that are suitable barrier materials.

U.S. Pat. No. 4,735,855, to Wofford, teaches a seven-layer thermoformable polymeric laminate having the following layer structure:
abuse layer/tie/nylon/EVOH/nylon/tie/sealant
The sealant layer may be any of various sealants, including an ionomer. The abuse layer also serves as a moisture barrier layer.

U.S. Pat. No. 4,746,562, to Fant, discloses a seven-layer polymeric film having the following layer structure:
LLDPE/tie/nylon/EVOH/nylon/tie/LLDPE
Each of the outer LLDPE layers also comprises an antiblocking agent.

U.S. Pat. No. 4,755,419, to Shah, discloses an oxygen barrier oriented seven layer heat-shrinkable film of the following layer structure:
blend/tie/nylon/EVOH/nylon/tie/blend
The blend used for the outer layers may be a blend of LLDPE, LMDPE and EVA. Alternatively, the outer layers may comprise a blend of ethylene propylene copolymer or polypropylene.

U.S. Pat. No. 4,788,105, to Mueller, teaches an oxygen barrier film which is adhered through use of an adhesive layer to a second film comprising a nylon. The film may also comprise an LLDPE outer layer.

U.S. Pat. No. 4,816,304, to Nohara, teaches a multi-layer gas barrier vessel with a core layer of EVOH sandwiched between two nylon layers, an outer layer of polyester, and an inner layer of polyester.

Commonly owned U.S. Pat. No. 4,818,592, to Ossian, teaches a core layer of EVOH sandwiched between two nylon layers. The film may also include a fourth layer of an adhesive and a fifth layer of a heat sealable polymer. In an alternative embodiment the film may also include a sixth layer of an adhesive and a seventh layer of a heat sealable polymer disposed on the fifth layer.

U.S. Pat. No. 4,833,696, to Iwanami, discloses a laminate with improved flex crack resistance, drawability and modality, and excellent gas impermeability. The laminate comprises a first layer of an EVOH copolymer and a thermoplastic polyester, and a second layer of a composition consisting of a group including nylon.

U.S. Pat. No. 4,855,178, to Langley, discloses a chemical barrier fabric in which a fabric material is laminated to a multilayer film of a layer of EVOH sandwiched between two layers of nylon. A heat-sealable polyethylene layer is disposed on the outside of the sheet material.

U.S. Pat. No. 4,909,726, to Bekele, teaches a multilayer polymeric film for chub packaging of the following layer structure:
heat seal/abuse layer/tie/nylon/EVOH/nylon/tie
The heat seal layer may be selected from the group consisting of ethylene alpha-olefin copolymer, LDPE, and ethylene ester copolymer, and may include an antiblocking agent. The abuse layer may be a very low density polyethylene or alternatively may be an ionomer.

U.S. Pat. No. 4,983,431, to Gibbons, teaches in FIG. 3 a five-layer polymeric film which is laminated to a substrate such as paperboard. The film has the following layer structure:

ionomer/nylon/EVOH/nylon/ionomer

One ionomer layer is laminated to the substrate while the second ionomer layer is coated with a layer of LDPE.

U.S. Pat. No. 4,937,112, to Schirmer, teaches a multilayer blown polymeric film for use in chub packaging. The film has a first outer layer of a heat sealable polymeric resin, such as LLDPE, a first interim layer comprising a polymeric material of high molecular weight such as LDPE, HDPE or EVA, a second interim layer comprising a nylon, and a second outer layer comprising a self-weldable polymeric material.

U.S. Pat. No. 4,999,229, to Moritani, teaches a multilayered polymeric gas barrier film with an intermediate layer of a composition having 50 to 97 weight percent EVOH and 45 to 3 weight percent nylon. As disclosed in Example 1, a layer of nylon may be disposed in contact with the intermediate layer.

U.S. Pat. No. 5,068,077, to Negi, teaches a multilayer polymeric film with a barrier layer of from 70 to 95 weight percent EVOH and from 5 to 30 weight percent nylon. The barrier layer may be sandwiched between two layers of nylon.

U.S. Pat. No. 5,194,306, to Blatz, teaches a polymeric blend of a major portion of an amorphous nylon and a minor portion of EVOH for use as a gas barrier in a multilayer polymeric film. In an alternative embodiment at column 6, lines 8 to 11, the invention may comprise a two layer structure with one layer of substantially EVOH and one layer of substantially amorphous nylon. At column 8, example 20 discloses a three layer structure comprising a core layer of EVOH sandwiched between two nylon layers.

However, none of the prior art cited above teaches or describes a multilayer polymeric film structure without a core layer of EVOH copolymer having a peelable seal component to provide an easy open package.

SUMMARY OF THE INVENTION

The present invention relates to a multilayer polymeric film structure and packages made therefrom. Specifically, the present invention relates to a multilayer polymeric film structure that does not include a layer of EVOH, has alternating layers of a polyamide, such as, for example, nylon, and adhesive. More specifically, the present invention provides a multilayer polymeric film structure having a peelable seal mechanism to provide a film that is easy to open using digital pull-apart forces. The films of the present invention may be coextruded and then blown into a tubular shape. The films are then cooled by the method of water quenching.

The films of the present invention, generally, have improved physical properties of "snap back" or "memory" over prior art films. The improved physical properties mean that after the film is used in the packaging of a product, the film shrinks or tightly wraps around the product. The films of the present invention create a much tighter package than prior art films, and retain tightness over a longer period of time than prior art films.

The films also have improved properties of gloss, and higher clarity and lesser haze than the prior art. The resulting film of the invention produces a packaging material having an improved structure and appearance. The advantages of the films of the invention are especially apparent in thermoforming applications. However, it should be noted that thermoforming is not required by the present invention.

The improved physical properties and appearance of the films of the present invention are believed to result from the water quenching method in which the films are made. The films are cooled by the application of air as the coextruded film leaves the die. After air cooling, the film is cooled by the application of water in direct contact with the film.

In addition, the films of the present invention have the further advantage of being heat sealable to themselves or to other films. Further, the films of the present invention are easily opened using digital pull-apart forces due to an easy-open peelable seal component that is incorporated into the film structure. This allows packages to be made from the films of the present invention that are easy to open to gain access to the interior of the package and the food product contained therein. The easy-open peelable seal mechanism may be contained in only one of the films, or in both films of a package utilizing two films.

To this end, in a first embodiment of the present invention, a multilayer polymeric film structure is provided. The multilayer polymeric film structure comprises a first layer of a polyamide, preferably nylon, a second layer of an adhesive, preferably anhydride modified polyethylene, a third layer of a polyamide, preferably nylon, a fourth layer of an adhesive, preferably anhydride modified polyethylene, a fifth layer of a polyamide, preferably nylon, a sixth layer of an adhesive, preferably anhydride modified polyethylene, and a seventh layer of a heat sealable polymer that may further have an easy-open peelable seal component.

The easy-open peelable seal mechanism may preferably comprise a polyethylene or polyethylene copolymer, such as low density polyethylene (LDPE), linear low density polyethylene (LLDPE), ultra low density polyethylene (ULDPE), very low density polyethylene (VLDPE), single site catalyzed polyethylene, medium density polyethylene (MDPE), high density polyethylene (HDPE), ethylene vinyl acetate copolymer (EVA), ethylene methyl acrylic acid copolymer (EMAA), ethylene methyl acrylate copolymer (EMA), ethylene acrylic acid copolymer (EAA), ethylene n-butyl acrylate copolymer (EnBA), ionomer, or any other polymer or copolymer apparent to one having ordinary skill in the art. In addition, the easy-open peelable seal mechanism may further comprise a polymer blended with the polyethylene or polyethylene copolymer that is relatively incompatible with the polyethylene or polyethylene blend so as to inhibit lock up seals from forming. The incompatible polymer may include polybutylene (PB), polypropylene (PP), high density polyethylene (HDPE), or any other incompatible polymer blend that inhibits lock-up seals. The total thickness of the film structure is between about 1.5 mils and about 8.0 mils.

In a second embodiment of the present invention, a multilayer polymeric film structure is provided. The multilayer polymeric film structure comprises a first layer of a polyamide, preferably nylon, a second layer of an adhesive, preferably anhydride modified polyethylene, a third layer of a polyamide, preferably nylon, a fourth layer of an adhesive, preferably anhydride modified polyethylene, a fifth layer of a polyamide, preferably nylon, a sixth layer comprising a first component of an adhesive polymer, preferably anhydride modified polyethylene, and a second component, and a seventh layer of a heat sealable polymeric material. The second component of the sixth layer may be polybutylene, polypropylene, high density polyethylene, or any other incompatible polymer blend that inhibits lock-up seals to provide an easy-open delaminable seal component between the sixth and the seventh layers when the seventh layer is pulled from the sixth layer. The total thickness of the film structure is between about 1.5 mils and about 8.0 mils.

In a third embodiment of the present invention, a food package is provided comprising a first multilayer polymeric film structure essentially as described above with reference to the first embodiment of the present invention. The first multilayer polymeric film structure is heat sealed to a second multilayer polymeric film structure. The first multilayer polymeric film structure may be peelable from the second multilayer polymeric film structure due to the blend of the polyethylene copolymer and the polybutylene, polypropylene, or high density polyethylene that may be contained within the seventh layer of the first multilayer polymeric film structure. The second multilayer polymeric film structure may comprise a film as described above, or a seven layer heat sealable film structure having a heat sealant layer comprising low density polyethylene, ethylene vinyl acetate, ethylene methyl acrylic acid, ethylene methyl acrylate, ethylene acrylic acid, or an ionomer.

In a fourth embodiment of the present invention, a food package is provided comprising a first multilayer polymeric film structure essentially as described above with reference to the second embodiment of the present invention. The first multilayer polymeric film structure is heat sealed to a second multilayer polymeric film structure. The first multilayer polymeric film structure may be peelable from the second multilayer polymeric film structure due to a blend of the adhesive and polybutylene, polypropylene, high density polyethylene, or other incompatible polymeric component that inhibits lock-up seals in the sixth layer of the first multilayer polymeric film structure. The first multilayer polymeric film structure may be delaminable between the sixth and the seventh layers when the seventh layer is pulled from the sixth layer. In addition, the second multilayer polymeric film may be a seven layer structure having six alternating layers of polyamide, preferably nylon, and adhesive, preferably anhydride modified polyethylene, and a seventh layer of a heat sealable layer comprising LLDPE, ULDPE, VLDPE, single site catalyzed PE, LDPE, MDPE, HDPE, EVA, EMAA, EMA, EAA, EnBA, an ionomer or any other ethylene polymer or copolymer apparent to one having ordinary skill in the art.

It is, therefore, an advantage of the present invention to provide a multilayer polymeric film structure having six alternating layers of nylon and adhesive, with a seventh layer of a heat sealant layer that may be easily peelable when the film structure is heat sealed to itself or to a second film structure. In addition, an advantage of the present invention is that the easy-open peelable seal component further provides a tamper evident mechanism.

In addition, it is an advantage of the present invention that the films may or may not be thermoformed with the application of heat to the films to retain a desired shape. The film structures further have strength, stiffness, and flexibility to store a food product when the food products are packaged within the package. Further, the film structures do not contain a layer of EVOH, thereby saving cost and increasing the processability and the ease of manufacture.

Additional features and advantages of the present invention are described in, and will be apparent from, the detailed description of the presently preferred embodiments and from the drawings.

DETAILED DESCRIPTION OF THE INVENTION

The present invention relates to a multilayer polymeric film structure and a food package made therefrom. Specifically, the present invention relates to a seven-layer non-EVOH structure having six layers of alternating nylon and adhesive, and a seventh layer of a heat sealable polymer. Either the sixth layer comprising the adhesive or the seventh layer comprising the heat sealable polymer may further comprise a polymer, preferably polybutylene, polypropylene or high density polyethylene, that may allow the film structure to be easily peelable. Moreover, the present invention relates to food packages made by the film structures having an easy-open peelable seal component contained therein.

Figure 1:
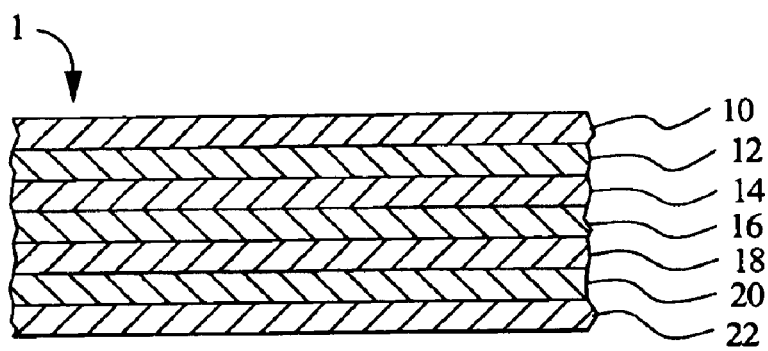
FIG. 1 illustrates a multilayer polymeric film structure in an embodiment of the present invention.

Referring now to the figures, wherein like numerals refer to like parts, FIG. 1 illustrates a film structure 1 of the present invention. The film structure 1 may have any thickness, and preferably has a thickness of between about 1.5 mils and about 10 mils, more preferably between about 4 mils and about 8 mils, and most preferably between about 5 mils and 6.5 mils.

The film structure 1 may have a first layer 10 of a polyamide polymer, preferably nylon, although it should be noted that any polyamide may be utilized that may be apparent to one having ordinary skill in the art. The first layer 10 may have a thickness of from about 5% to about 20% of the thickness of the film, preferably about 9%. The first layer 10 is an outer layer that may further comprise an antiblocking agent, such as antiblocking agents which are common in the art of making films, such as inorganic spheres (especially those derived from a combination of silica and aluminum), talc, diatomaceous earth, silica, calcium carbonate, or other particulates, or combinations of any of these agents. The antiblocking agent serves to roughen the surface of the film, thereby lowering the coefficient of friction of the films.

In a preferred embodiment, the first layer 10 is a layer in which the antiblocking agent is contained in a nylon carrier composition. One such type of carrier composition is disclosed in commonly owned U.S. Pat. No. 5,109,049, the disclosure of which is incorporated herein by reference. As disclosed in the referenced patent at column 2, line 61 to column 3, line 6, nylon carrier compositions are especially effective when used in forming an outer layer of a multilayer packaging film. In a preferred arrangement, the nylon carrier composition is used in an outer layer.

In one type of film made with the nylon carrier composition, a polymeric material comprising about 20% to about 85% nylon is combined with about 80% to about 15% of a nylon carrier composition including antiblocking agent. The nylon carrier composition, which may comprise any of the various nylons including nylon 6, nylon 6,6, nylon 6,66, nylon 6,12, or amorphous nylon, may be from about 35% to about 80% antiblocking agent and about 65% to about 30% nylon polymer.

Alternatively, the film of the nylon carrier composition may be a blend of about 95% to about 99.5% of the nylon polymer and about 5% to about 0.5% of an additive concentrate, in which the additive concentrate includes the antiblocking agent incorporated into a second nylon polymer composition.

A particular antiblocking agent that is preferred for including in the nylon carrier composition is an antiblock agent manufactured by Zeelan Industries of St. Paul, Minn., under the name "Zeeospheres". Zeeospheres are inorganic ceramic spheres comprising silica and alumina. For example, zeeospheres are incorporated as the antiblocking agent in the nylon carrier composition Reed Spectrum antiblock no. 1081274.

The film structure 1 has a second layer 12 that may be an adhesive layer. Preferably, the adhesive layer may be a maleic anhydride modified polyethylene copolymer, such as ethylene vinyl acetate (EVA)-based or linear low density polyethylene (LLDPE)-based adhesive, or any of the various other polymeric adhesives commonly used in the art of making multilayer films. The second layer 12 may comprise between about 5% to about 20% of the total thickness of the film, preferably, about 13%.

The film structure 1 has a third layer 14 that may comprise another polyamide polymer, preferably nylon, as in the first layer 10. Typically, layer 14 does not include an antiblocking agent. The thickness of the third layer 14 may be between about 5 and about 20% of the total thickness of the film structure, preferably about 9%.

The film structure 1 further has a fourth layer 16 that may be an adhesive layer. Preferably, the adhesive layer may be a maleic anhydride modified polyethylene copolymer, such as EVA-based or LLDPE-based adhesive, or any of the various other polymeric adhesives commonly used in the art of making multilayer films. The fourth layer 16 may comprise between about 5% and about 20% of the total thickness of the film structure 1. Preferably, the fourth layer 16 comprises about 10% of the total thickness of the film structure.

The film structure 1 further has a fifth layer 18 that may comprise another polyamide polymer, preferably nylon, as in the first layer 10 and the third layer 14. As in the third layer 14, the fifth layer 18 typically does not contain an antiblocking agent. The thickness of the fifth layer 18 may be between about 5% and about 20% of the total thickness of the film structure 1. Preferably, the fifth layer 18 comprises about 9% of the total thickness of the film structure 1.

The above-identified polyamide layers 10, 14, and 18 may be any of various nylons commonly used in the art of making polymeric films, including nylon 6, nylon 6,6, nylon 6,66, nylon 12, or amorphous nylon. Preferably, the nylon used in the film structure 1 may be nylon 6. However, in an alternate embodiment the nylon comprises an amorphous nylon copolymer that is blended with one or more of various other nylons.

An amorphous nylon copolymer is a particular type of nylon polymer that differs from crystalline or semicrystalline nylons. Amorphous nylon copolymers are characterized by a lack of crystallinity, which can be shown by the lack of an endotherm crystalline melting point in a Differential Scanning Calorimeter ("DSC") test ASTM D-3417.

A lesser degree of crystallinity indicates the ease with which a film can be further fabricated, such as by thermoforming, orienting in the solid state, laminating, or the like. The degree of crystallinity also correlates to the brittleness of the film, and therefore the film's tendency to break or crack when subjected to physical or thermal shock. Physical or thermal shocks generally occur during further converting operations, such as in thermoforming and in the handling involved in fabricating packages, in filling and sealing them, and in shipping the filled and sealed packages in the product distribution system.

An amorphous nylon copolymer is generally a semicrystalline polymer that is made amorphous by rapid quenching of the melt, thereby preventing the development of a crystalline structure and producing a transparent solid. Alternatively, chemical modifications can be made to the chemical backbone of the polymer in order to significantly reduce or eliminate the ability of the polymer chains to organize in an orderly, crystalline arrangement without need for rapid quenching of the melt.

An example of an amorphous nylon copolymer that is suitable for use in the films of the invention is Grivory.RTM G21, manufactured by EMS—American Grilon, Inc. of Sumter, S.C. Grivory.RTM G21 has a glass transition temperature by the DSC method of approximately 125.degree. C.; a specific gravity of approximately 1.18, as measured by ASTM D792; a moisture absorption after 24 hour immersion of 1.29%, as measured by ASTM D570; and a melt flow index of 90 ml./10 min., as measured by DIN 53735.

Grivory.RTM G21's physical properties include a tensile strength of 10,400 psi, as measured by ASTM D638; 15% elongation at break, as measured by ASTM D638; a flexural strength of 17,300 psi at ASTM D790; a flexural modulus of 416,000 psi at ASTM D790; an Izod impact strength notched of 1.0 ft.-lb./in., as measured by ASTM D256, and a Shore hardness of 80 D-Scale.

In an embodiment, the nylon polymer of each of layers 10, 14 and 18 is from 5 to 35 weight percent of each layer. The nylon polymer of layers 14 and 18 may be blended with any of various other nylons. For example, the nylon polymer may be blended with nylon 6, nylon 6,6, nylon 6,66, nylon 6,12, nylon 12, a partially aromatic polyamide, and/or an amorphous polyamide.

In another embodiment, if an amorphous nylon is used in any one of layers 10, 14 and 18, a nucleating agent may be added to the amorphous nylon copolymer, or the amorphous nylon copolymer may be blended with a nucleated nylon homopolymer. In an embodiment, the nucleated homopolymer may be a high viscosity nucleated homopolymer, with a viscosity of approximately 120 or above. One such nucleating agent is 3909 FN, manufactured by Allied Signal Chemical Company.

The film structure 1 further has a sixth layer 20 that may be an adhesive layer. Preferably, the adhesive layer may be a maleic anhydride modified polyethylene copolymer, such as EVA-based or LLDPE-based adhesive, or any of the various other polymeric adhesives commonly used in the art of making multilayer films. The sixth layer 20 may comprise between about 5% and about 30% of the total thickness of the film structure 1. Preferably, the sixth layer 20 comprises about 25% of the total thickness of the film structure.

The film structure 1 further has a seventh layer 22. The seventh layer 22 is a sealant layer that is capable of forming a heat seal with various other polymeric materials. Heat sealable, as used herein, means sealable or bondable by heat however obtained, for example, by induction or magnetic, ultrasonic, radio frequency, light, laser, or other energy sources which cause the materials to bond, fuse or otherwise seal. Such heat sealable materials usually are thermoplastic film forming polymers, are well-known in the art, and include ethylene polymers and copolymers, and copolymers of ethylene and ethylenically unsaturated comonomer selected from the group consisting of carboxylic acids and esters, salts and anhydrides thereof. The seventh layer 22 may comprise any of the various polymers used in sealant layers, such as LLDPE, including all linear polyethylenes with density up to about 0.95 g/cc, LDPE, EVA, medium density polyethylene (MDPE), high density polyethylene (HDPE), ultra low density polyethylene, very low density polyethylene, olefins catalyzed by a single site catalyst such as metallocene, EMA, EAA, ethylene nornal-butyl acrylate (ENBA), EMAA, an ionomer, or a blend of any of these polymers, or heat seal coatings.

Moreover, the seventh layer 22 comprises a heat seal "poisoning" component, such as, preferably, polybutylene, polypropylene, high density polyethylene, or other incompatible blend components which interfere with the lock-up or fusion of the seal, may be incorporated as may be apparent to one having ordinary skill in the art. The poisoning component interferes with the heat sealable properties of the seventh layer 22 so that the bond formed between the seventh layer 22 and various other polymeric materials may be easily severed when force is applied to pull the seventh layer 22 from the other polymeric material to which the seventh layer 22 is heat sealed. When a force is applied, such as a digital pull-apart force by an individual attempting to gain access to the interior of a package made by the film structure 1, the bond between the seventh layer 22 and the other polymeric material will easily break. As noted, preferable materials to use to poison the heat seal created when the seventh layer 22 is heat sealed to another polymeric material is polybutylene, polypropylene and/or high density polyethylene. More preferably, the polybutylene, polypropylene, or high density polyethylene is blended with the heat seal material. A preferably heat seal material to blend with polybutylene, polypropylene or high density polyethylene is EVA or LLDPE.

The seventh layer 22 may have a thickness of between about 15% and about 40% of the thickness of the film and is preferably about 25%.

It should be noted that, although the above film structure 1 has been described as having only seven layers, the film structure 1 may have more layers, depending on the particular properties of the film structure that are desired. For example, a nine or eleven layer (or more) structure may be manufactured if a tougher, thicker, and/or stiffer film is desired.

Figure 2:
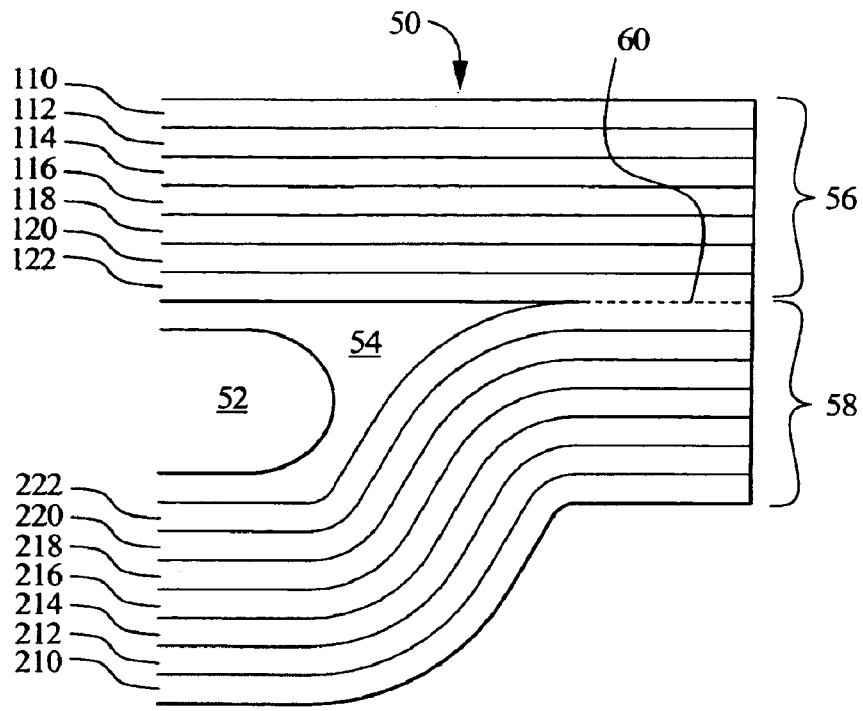
FIG. 2 illustrates a food package in an embodiment of the present invention.

FIG. 2 illustrates a food package 50 that may be created utilizing the film structure 1 as shown in FIG. 1. The food package 50 may have a food product 52 contained within a space 54 created within two film structures 56, 58. The two film structures 56, 58 may be heat-sealed together at 60 to form the food package 50. For example, the food product 52 may be a frozen pizza that is substantially round in shape. The film structure 58 may be a thermoformed film that may create a "dish" or tray shape for the frozen pizza to sit therein. The film structure 56 may be a lid that may be heat sealed to the film structure 58 around a perimeter of the film structure 58 to form the space 54.

The film structure 56 may be a seven layer film structure substantially as described above with reference to FIG. 1. Specifically, the film structure 56 may have a first polyamide layer 110, a second adhesive layer 112, a third polyamide layer 114, a fourth adhesive layer 116, a fifth polyamide layer 118, a sixth adhesive layer 120, and a seventh heat sealable layer 122.

Moreover, the film structure 58 may also comprise a seven layer structure that has similar components as film structure 56. The film structure 58 may also have a first polyamide outer layer 210, a second adhesive layer 212, a third polyamide layer 214, a fourth adhesive layer 216, a fifth polyamide layer 218, a sixth adhesive layer 220, and a seventh heat sealable layer 222. The film structure 56 may have a thickness that is less than the thickness of the film structure 58, because the film structure 58 is thermoformed and must hold the food product therein. Moreover, sharp edges of the food product, such as, for example, corn meal that may be placed within the food package 50 to maintain the taste, texture and/or visual appearance of the food product, may pierce the film structure 58 if not thick enough. In a preferred embodiment of the present invention, the thickness of the film structure 56 may be about 5.0 mils and the thickness of the film structure 58 may be about 6.5 mils. Further, in a preferred embodiment of the present invention, the film structure 56 may correspond to film structure 1, as described above with reference to FIG. 1. Film structure 58 may correspond to a thermoformable seven layer film corresponding to the non-EVOH seven layer film described and claimed in U.S. Pat. No. 6,068,933.

Figure 3:
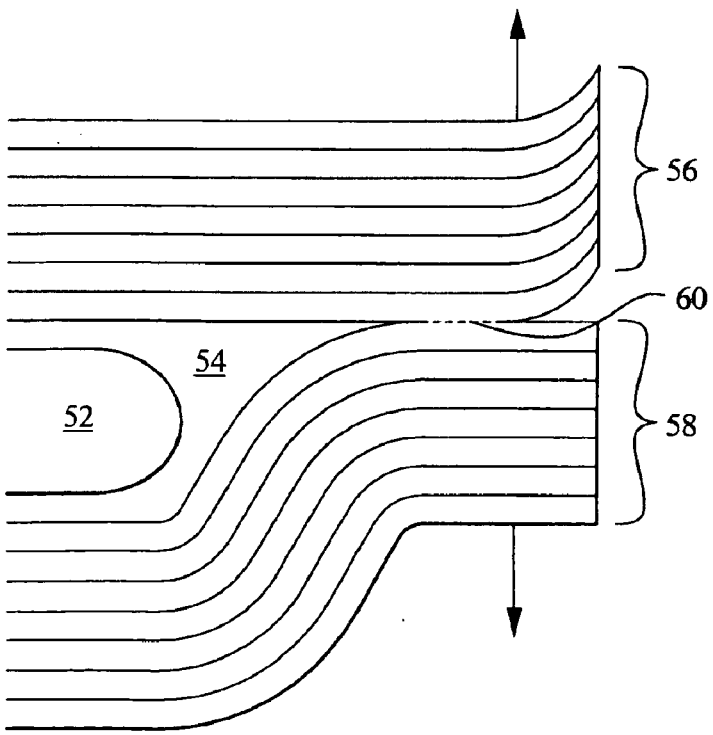
FIG. 3 illustrates another food package with an easy-open peelable seal component in an alternate embodiment of the present invention.

The seventh heat sealable layer 122 may have the heat seal poisoning component of polybutylene, polypropylene, or high density polyethylene so as to create an easy-open peelable seal mechanism. In an alternate embodiment, the seventh heat sealable layer 222 may have the heat seal poisoning component of polybutylene, polypropylene or high density polyethylene so as to create the easy-open peelable seal mechanism. In a still further embodiment of the present invention, both the seventh layer 122 of the film structure 56 and the seventh layer 222 of the film structure 58 may have the heat seal poisoning component so as to create the peelable seal mechanism between the seventh layers 122, 222 of the film structures 56, 58 at the heat seal 60. FIG. 3 illustrates the peelable seal that is created when the seventh layer of either the film structure 56, the film structure 58, or both comprise the blend of the polyethylene copolymer and a poisoning agent, such as polybutylene, polypropylene or high density polyethylene. As shown in FIG. 3, the film structure 56 delaminates from the film structure 58 at the heat seal 60 when pull-apart forces are placed on the film structures 56, 58.

Figure 4:
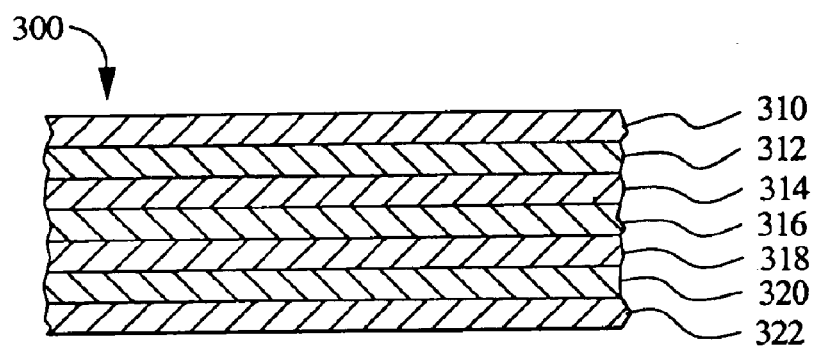
FIG. 4 illustrates a multilayer polymeric film structure in another embodiment of the present invention.

FIG. 4 illustrates a film structure 300 in an alternate embodiment of the present invention. The film structure 300 may be a seven layer structure having layers 310, 312, 314, 316 and 318 that may substantially correspond to film layers 10, 12, 14, 16, and 18, as shown and described in FIG. 1. The sixth layer 320, however, may comprise an adhesive such as, preferably, a maleic anhydride modified polyethylene, such as EVA-based or LLDPE-based. Blended with the adhesive may be the poisoning agent, preferably polybutylene, polypropylene or high density polyethylene, such that the film structure 300 may delaminate between the sixth and the seventh layers when pull-apart forces are placed upon a package made from the film structure 300. Moreover, the seventh layer 322 may comprise merely a heat sealable polymer or copolymer, such as, for example, LLDPE, ULDPE, VLDPE, single site catalyzed PE, LDPE, MDPE, HDPE, EVA, EMAA, EMA, EAA, EnBA, or an ionomer.

Figure 5:
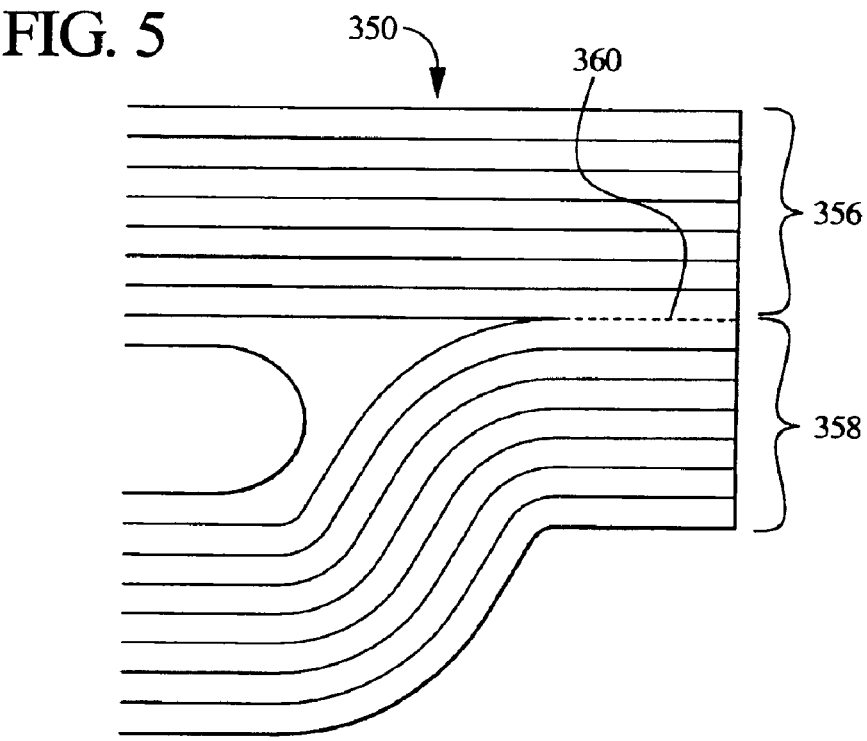
FIG. 5 illustrates a food package in another alternate embodiment of the present invention.

Therefore, when a food package 350 is made, as shown in FIG. 5, a film structure 356 may be heat sealed to a film structure 358 at the heat seal 360. The film structure 356 may correspond substantially to the film structure 300, as shown in FIG. 4. Alternatively, the film structure 358 may correspond to the film structure 300, as shown in FIG. 4. Although, technically, both film structures 356 and 358 may correspond to the film structure 300, as shown in FIG. 4 at the same time, it would be impractical to do so, as delamination between the sixth and seventh layers of both film structures 356 and 358 at the same time would cause a plurality of problems, such as unsightliness and stringing of the films when they are pulled apart.

Figure 7:
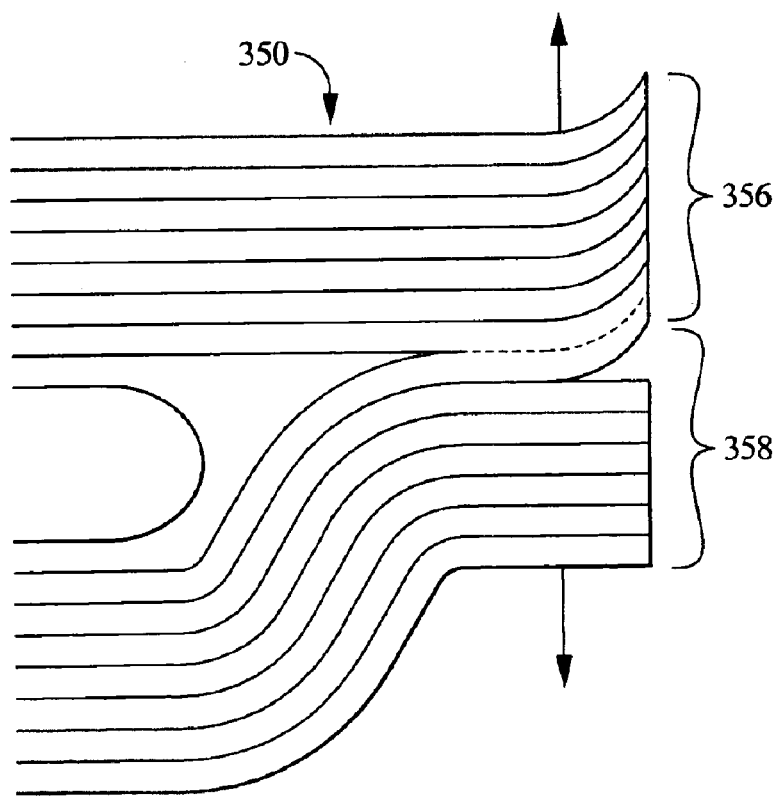
FIG. 7 illustrates a food package with an easy-open delaminable peelable layer in an embodiment of the present invention.
Figure 6:
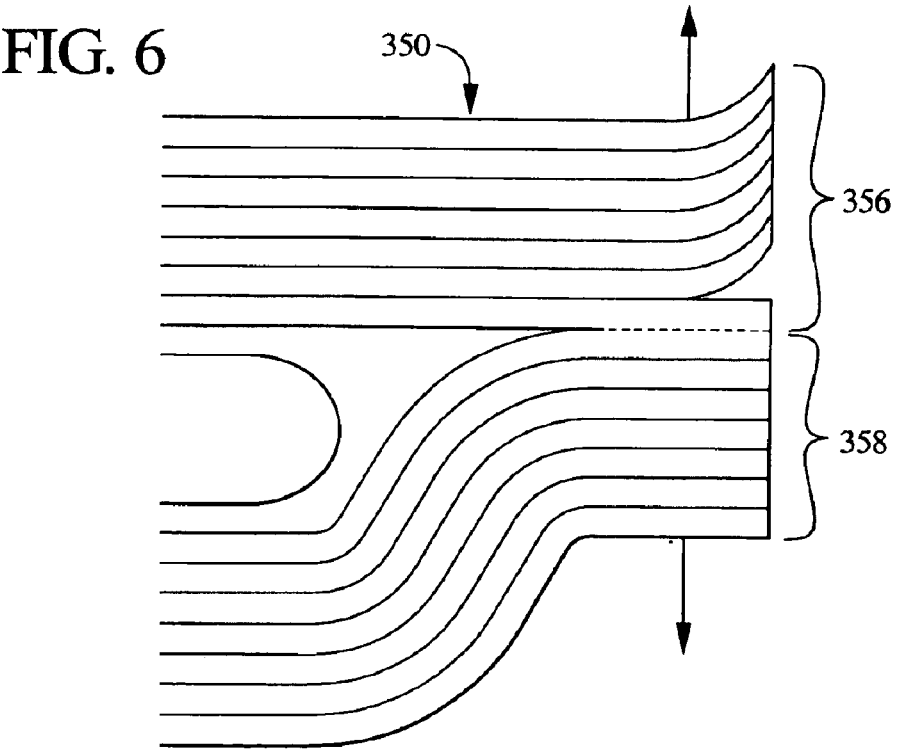
FIG. 6 illustrates a food package with an easy-open delaminable peelable seal mechanism in an alternate embodiment of the present invention.

FIG. 6 illustrates a food package 350 having the film structures 356 that corresponds to the film structure 300, as shown in FIG. 4, and that pull-apart forces delaminate film structure 356 between the sixth layer and the seventh layer. The film structure 358 may be a seven layer structure having the structure as shown and described in U.S. Pat. No. 6,068,933. Alternatively, FIG. 7 illustrates the food package 350 where the film structure 358 corresponds to the film structure 300, as shown in FIG. 4. Delamination occurs between the sixth and the seventh layers of the film structure 358 when pull-apart forces are applied to the food package 350. In other words, either the film structure 356 or the film structure 358 may correspond to the film structure 300, as described above with reference to FIG. 4.

The films of the invention may be manufactured by any of various methods common in the art of making polymeric films. Preferably, the films of the invention are melt coextruded in a multilayer coextrusion die according to any one of the various embodiments and then formed in the general manner taught by expired U.S. Pat. No. 3,337,663, to Taga, and expired U.S. Pat. No. 3,090,998, to Heisterkamp, both of which are hereby incorporated by reference. The films are coextruded in a tubular form, wherein the first outer layer of the finished film is the inner layer of the tubular form or tube. The tube is then inflated by the admission of air, cooled, collapsed, and wound up to form a finished roll or rolls.

Figure 8:
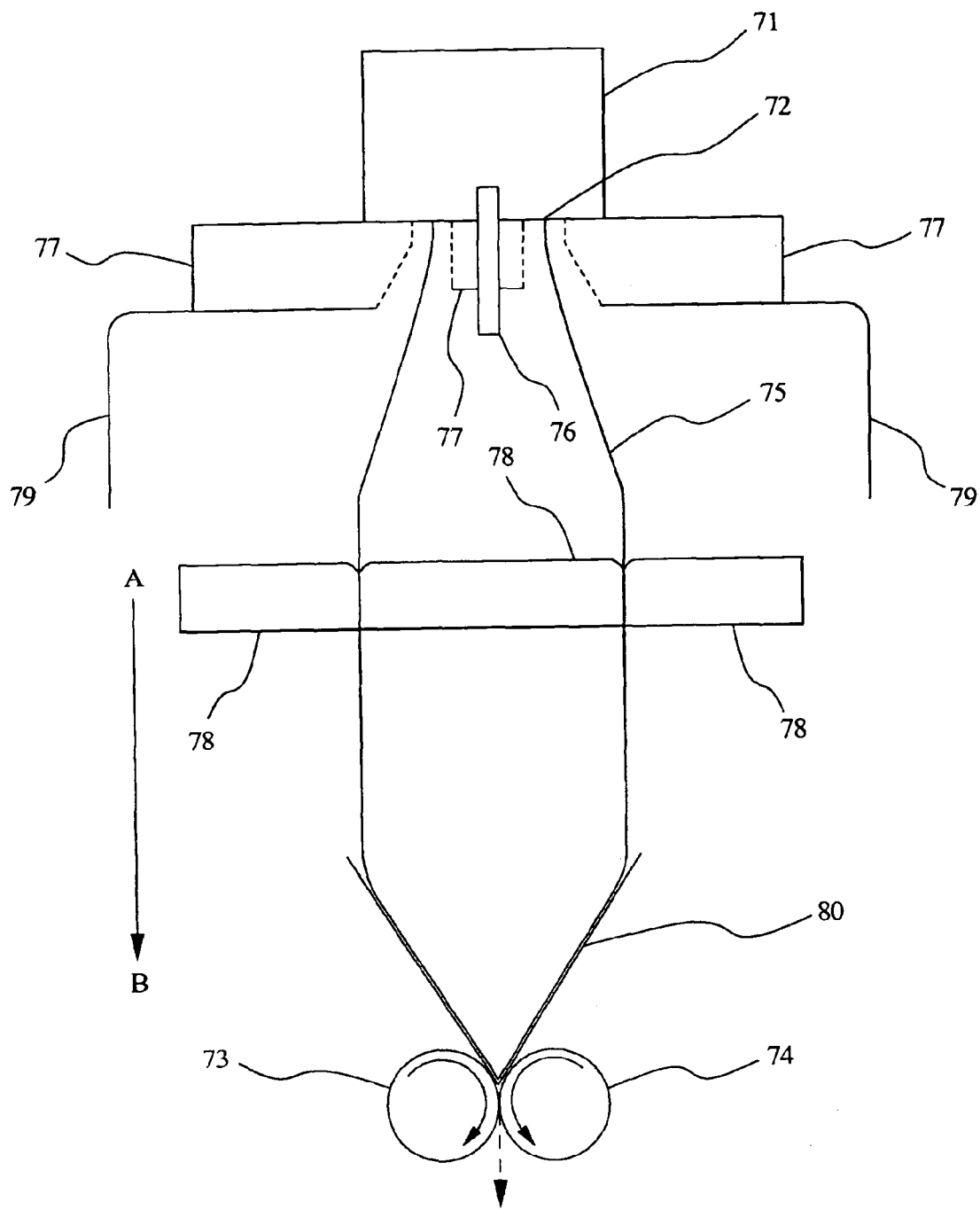
FIG. 8 illustrates a method of making the films of the present invention.

FIG. 8 depicts a preferred method of manufacturing the films of the invention. A multilayer film according to any of the various embodiments of the invention is coextruded through orifice 72 of die 71 as molten thermoplastic material 75. The molten thermoplastic material 75 is pulled down through collapsing shield 80, in the direction of arrows A to B, by nip rollers 73 and 74. Roller 73 turns upon its axis in a clockwise direction, while roller 74 turns upon its axis in a counter-clockwise direction. Molten thermoplastic material 75 is expanded into a tubular form or "bubble" by inflation caused by a volume of gas injected through gas outlet 76. Gas outlet 76 is located in die 71 such that the exhausting air inflates the bubble.

Air rings 77 are located externally and/or internally of the bubble. As the molten thermoplastic material 75 is inflated into a bubble, the application of air from air rings 77 acts to control the cooling and stabilize the molten thermoplastic material. The air rings 77 can apply air at various temperatures and at a range of velocities. In addition to cooling by air rings 77, thermoplastic molten material 75 is also cooled by water rings or mandrels 78, also located both externally and/or internally of the bubble. Like the air rings, the water rings 78 can apply water at various temperatures and at a range of velocities.

A covering 79 may append from the die to surround the bubble as it exits the die. The length and size of the covering will affect the relative air pressures internally and externally of the bubble.

The method of making the films of the invention as disclosed above results in thermoplastic multilayer films with improved physical properties over prior art films. These improvements result from the degree of control over the crystallinity of the polymeric film achieved by this method. The crystallinity is first controlled by the application of air though air rings 77. The temperature and velocity of the air applied through air rings 77 controls the degree of crystallinity. Subsequently, the rapid cooling caused by the method of water quenching effectively freezes the amount of crystallization achieved during air cooling in the finished polymeric film.

The water-quenched films of the invention have several improved physical properties over prior art films that are cooled by more conventional methods. For example, the films of the invention have improved clarity and processability.

EXAMPLES

The following film structures were coextruded via the water quench film-forming method as described above. The film structures, generally, are seven layer, non-forming, non-EVOH containing structures utilized as lidding or as a top web for a frozen pizza tray.

Example 1

| Layer | Resin | % of Layer | Film Density | % of Web | % of Weight | Layer Weight | Desired Caliper |
|---|---|---|---|---|---|---|---|
| 1 | Nylon 6 | 97.0 | 1.092 | 9.00 | 9.94 | 6.18 | .36 |
|   | Antiblock | 3.0 | 1.397 |   | .31 |   |   |
| 2 | LLDPE-Tie | 100.0 | .916 | 13.0 | 12.33 | 7.43 | .52 |
| 3 | Nylon 6 | 100.0 | 1.092 | 9.0 | 10.19 | 6.14 | .36 |
| 4 | LLDPE-Tie | 100.0 | .916 | 10.0 | 9.47 | 5.71 | .40 |
| 5 | Nylon 6 | 100.0 | 1.092 | 9.0 | 10.19 | 6.14 | .36 |
| 6 | LLDPE-Tie | 100.0 | .916 | 25.0 | 23.69 | 14.28 | 1.0 |
| 7 | EVA | 72.0 | .932 | 25.0 | 17.20 | 14.40 | 1.0 |
|   | Polybutylene | 25.0 | .900 |   | 5.97 |   |   |
|   | Slip/Antiblock | 2.0 | .909 |   | .48 |   |   |
|   | Processing Aid | 1.0 | .925 |   | .24 |   |   |

Total Caliper = 4.0 mils
Basis Weight = 60.28

Example 2

| Layer | Resin | % of Layer | Film Density | % of Web | % of Weight | Layer Weight | Desired Caliper |
|---|---|---|---|---|---|---|---|
| 1 | Nylon 6 | 97.0 | 1.092 | 9.00 | 9.94 | 6.95 | .41 |
|   | Antiblock | 3.0 | 1.397 |   | .31 |   |   |
| 2 | LLDPE-Tie | 100.0 | .916 | 13.0 | 12.33 | 8.36 | .59 |
| 3 | Nylon 6 | 100.0 | 1.092 | 9.0 | 10.19 | 6.90 | .41 |
| 4 | LLDPE-Tie | 100.0 | .916 | 10.0 | 9.47 | 6.43 | .45 |
| 5 | Nylon 6 | 100.0 | 1.092 | 9.0 | 10.19 | 6.90 | .41 |
| 6 | LLDPE-Tie | 100.0 | .916 | 25.0 | 23.69 | 16.07 | 1.13 |
| 7 | EVA | 72.0 | .932 | 25.0 | 17.20 | 16.20 | 1.13 |
|   | Polybutylene | 25.0 | .900 |   | 5.97 |   |   |
|   | Slip/Antiblock | 2.0 | .909 |   | .48 |   |   |
|   | Processing Aid | 1.0 | .925 |   | .24 |   |   |

Total Caliper = 4.5 mils
Basis Weight = 67.81

Example 3

| Layer | Resin | % of Layer | Film Density | % of Web | % of Weight | Layer Weight | Desired Caliper |
|---|---|---|---|---|---|---|---|
| 1 | Nylon 6 | 97.0 | 1.092 | 9.00 | 9.94 | 7.72 | .45 |
|   | Antiblock | 3.0 | 1.397 |  | .31 |  |  |
| 2 | LLDPE-Tie | 100.0 | .916 | 13.0 | 12.33 | 9.28 | .65 |
| 3 | Nylon 6 | 100.0 | 1.092 | 9.0 | 10.19 | 7.67 | .45 |
| 4 | LLDPE-Tie | 100.0 | .916 | 10.0 | 9.47 | 7.14 | .50 |
| 5 | Nylon 6 | 100.0 | 1.092 | 9.0 | 10.19 | 7.67 | .45 |
| 6 | LLDPE-Tie | 100.0 | .916 | 25.0 | 23.69 | 17.85 | 1.25 |
| 7 | EVA | 72.0 | .932 | 25.0 | 17.20 | 18.0 | 1.25 |
|   | Polybutylene | 25.0 | .900 |  | 5.97 |  |  |
|   | Slip/Antiblock | 2.0 | .909 |  | .48 |  |  |
|   | Processing Aid | 1.0 | .925 |  | .24 |  |  |

Total Caliper = 5.0 mils
Basis Weight = 75.33

The above-identified examples 1–3 may be incorporated into a food package as described above with reference to FIGS. 2 and 3. For example, the above examples 1–3 may form lidding or a top web for a food package having a thermoformable multilayer polymeric film structure as a tray or a bottom web for the food package. The bottom web may be thermoformed by the application of heat to retain a desired shape, such as a tray to hold a frozen pizza. The top web may be heat sealed to the bottom web, but may delaminate between the seventh layer of the top web and the bottom web due to the poisoning effect of the polybutylene, polypropylene or high density polyethylene that may be contained within the seventh layer of the top web. For example, the bottom web may have the following structures:

Example 4

| Layer | Resin | % of Layer | Film Density | % of Web | % of Weight | Layer Weight | Desired Caliper |
|---|---|---|---|---|---|---|---|
| 1 | Nylon 6 | 97.0 | 1.092 | 9.00 | 9.91 | 9.25 | .54 |
|   | Antiblock | 3.0 | 1.397 |  | .31 |  |  |
| 2 | LLDPE-Tie | 100.0 | .916 | 13.0 | 12.33 | 11.14 | .78 |
| 3 | Nylon 6 | 100.0 | 1.092 | 9.0 | 10.16 | 9.19 | .54 |
| 4 | LLDPE-Tie | 100.0 | .91 | 10.0 | 9.47 | 8.57 | .60 |
| 5 | Nylon 6 | 100.0 | 1.092 | 9.0 | 10.16 | 9.19 | .54 |
| 6 | LLDPE-Tie | 100.0 | .916 | 25.0 | 23.70 | 21.44 | 1.50 |
| 7 | LLDPE | 72.0 | .916 | 25.0 | 13.24 | 21.69 | 1.50 |
|   | EVA | 25.0 | .927 |  | 9.59 |  |  |
|   | Antiblock | 2.0 | 1.106 |  | .96 |  |  |
|   | Processing Aid | 1.0 | .925 |  | .18 |  |  |

Total Caliper = 6.0 mils
Basis Weight 90.47

Example 5

| Layer | Resin | % of Layer | Film Density | % of Web | % of Weight | Layer Weight | Desired Caliper |
|---|---|---|---|---|---|---|---|
| 1 | Nylon 6 | 97.0 | 1.092 | 9.00 | 9.92 | 10.03 | .59 |
|   | Antiblock | 3.0 | 1.397 |  | .31 |  |  |
| 2 | LLDPE-Tie | 100.0 | .916 | 13.0 | 12.31 | 12.07 | .85 |
| 3 | Nylon 6 | 100.0 | 1.092 | 9.0 | 10.17 | 9.97 | .59 |
| 4 | LLDPE-Tie | 100.0 | .916 | 10.0 | 9.47 | 9.28 | .65 |
| 5 | Nylon 6 | 100.0 | 1.092 | 9.0 | 10.17 | 9.97 | .59 |
| 6 | LLDPE-Tie | 100.0 | .916 | 25.0 | 23.69 | 23.22 | 1.63 |
| 7 | LLDPE | 72.0 | .916 | 25.0 | 13.24 | 23.49 | 1.63 |
|   | EVA | 25.0 | .927 |  | 9.59 |  |  |
|   | Antiblock | 2.0 | 1.106 |  | .96 |  |  |
|   | Processing Aid | 1.0 | .925 |  | .18 |  |  |

Total Caliper = 6.5 mils
Basis Weight = 98.03

Example 6

A preferable food package may comprise a top web consisting of a film structure substantially described above in Example 3, and a bottom web consisting of a film structure described above in Example 5. The bottom web may be thermoformed into a tray shape by the application of heat. For example, the thermoforming may be accomplished by the application of heat of between about 100° C. and about 180° C., preferably about 140° C. Moreover, the top web and the bottom web may be heat sealed together at a temperature of between about 130° C. and 200° C., preferably about 165° C., with a food product contained therein, such as, preferably, a frozen pizza.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:
1. A frozen food package, said food package comprising:
a first coextruded multilayer polymeric film wherein said film comprises:
 a first layer, said first layer comprising a polyamide;
 a second layer, said second layer comprising an adhesive, said second layer disposed in contact with said first layer;
 a third layer, said third layer comprising a polyamide, said third layer disposed in contact with said second layer;
 a fourth layer, said fourth layer comprising an adhesive, said fourth layer disposed in contact with said third layer;
 a fifth layer, said fifth layer comprising a polyamide, said fifth layer disposed in contact with said fourth layer;
 a sixth layer, said sixth layer comprising an adhesive, said sixth layer disposed in contact with said fifth layer; and
 a seventh layer, said seventh layer comprising a blend of polymers
wherein the first polymer is ethylene vinyl acetate copolymer and the second polymer is polybutylene, said seventh layer disposed in contact with said sixth layer and wherein said seventh layer of said first multilayer polymeric film is sealable to a second thermoformable multilayer polymeric film, and wherein the first multilayer polymeric film is easily peelable from the second multilayer polymeric film.

2. The frozen food package of claim 1 wherein said second multilayer polymeric film comprises:

a first layer, said first layer comprising a polyamide;

a second layer, said second layer comprising an adhesive, said second layer disposed in contact with said first layer;

a third layer, said third layer comprising a polyamide, said third layer disposed in contact with said second layer;

a fourth layer, said fourth layer comprising an adhesive, said fourth layer disposed in contact with said third layer;

a fifth layer, said fifth layer comprising a polyamide, said fifth layer disposed in contact with said fourth layer;

a sixth layer, said sixth layer comprising an adhesive, said sixth layer disposed in contact with said fifth layer; and a seventh layer, said seventh layer comprising a heat sealable polymer or polymer blend wherein said polymer blend comprises linear low density polyethylene and ethylene vinyl acetate copolymer wherein said seventh layer is disposed in contact with said sixth layer, and wherein said multilayer polymeric film does not contain an EVOH core layer.

* * * * *